United States Patent
Kozakai et al.

(10) Patent No.: US 11,435,627 B2
(45) Date of Patent: Sep. 6, 2022

(54) LCOS DISPLAY DEVICE AND ELECTRONIC DEVICE

(71) Applicant: OMNIVISION SEMICONDUCTOR (SHANGHAI) CO., LTD., Shanghai (CN)

(72) Inventors: Takashi Kozakai, Kanagawa (JP); Regis Fan, Sunnyvale, CA (US); Ming Zhang, Fremont, CA (US); Libo Weng, San Jose, CA (US)

(73) Assignee: OMNIVISION SEMICONDUCTOR (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/406,466

(22) Filed: Aug. 19, 2021

(65) Prior Publication Data
US 2022/0236612 A1    Jul. 28, 2022

(30) Foreign Application Priority Data

Jan. 27, 2021   (CN) .......................... 202110112514.6

(51) Int. Cl.
*G02F 1/1343*   (2006.01)
*G02F 1/1345*   (2006.01)
(Continued)

(52) U.S. Cl.
CPC .... *G02F 1/134309* (2013.01); *G02F 1/13452* (2013.01); *G02F 1/133345* (2013.01); *G02F 1/133553* (2013.01)

(58) Field of Classification Search
None
See application file for complete search history.

(56) References Cited

U.S. PATENT DOCUMENTS

| | | | |
|---|---|---|---|
| 6,950,454 B2 * | 9/2005 | Kruschwitz | H04N 9/3152 372/39 |
| 8,248,328 B1 * | 8/2012 | Wedding | H01J 11/18 345/63 |

(Continued)

FOREIGN PATENT DOCUMENTS

| | | |
|---|---|---|
| CN | 1658026 A | 8/2005 |
| CN | 108700768 A | 10/2018 |

(Continued)

OTHER PUBLICATIONS

Zhao, Xiuqin, "AR Coating and HR Coating", Journal of Taiyuan Teachers College (Natural Science Edition), vol. 2, No. 4, Dec. 2003, pp. 42-45 (English Abstract Submitted).

*Primary Examiner* — Ryan Crockett
(74) *Attorney, Agent, or Firm* — Womble Bond Dickinson (US) LLP

(57) ABSTRACT

A liquid crystal on silicon (LCOS) display device and an electronic device are disclosed. The LCOS display device includes a wafer substrate and a pixel electrode layer over the wafer substrate. The pixel electrode layer comprises a plurality of pixel electrodes, and a reflector stack or at least a stack comprised of, stacked vertically downward, a first high refractive index insulating layer and a first low refractive index insulating layer is arranged between every adjacent two pixel electrodes. By arranging the reflector stacks or stacked layers (in the gaps) between adjacent pixel electrodes, the gaps exhibit higher reflectivity and produce less diffraction noise.

18 Claims, 2 Drawing Sheets

(51) Int. Cl.
*G02F 1/1335* (2006.01)
*G02F 1/1333* (2006.01)

(56) References Cited

U.S. PATENT DOCUMENTS

| | | |
|---|---|---|
| 2004/0036824 A1 | 2/2004 | Lee |
| 2005/0030451 A1 | 2/2005 | Liu |
| 2007/0103621 A1 | 5/2007 | Chen et al. |
| 2007/0146847 A1* | 6/2007 | sakaguchi ............. G11B 7/128 |
| 2007/0242195 A1 | 10/2007 | Kuan et al. |
| 2009/0147161 A1* | 6/2009 | Ito ............................ G02F 1/29 |
| | | 349/25 |
| 2009/0296190 A1* | 12/2009 | Anderson ............. B32B 27/286 |
| | | 156/60 |
| 2011/0080545 A1 | 4/2011 | Ohbayashi |
| 2014/0009731 A1* | 1/2014 | O'Callaghan ..... G02F 1/136277 |
| | | 349/114 |
| 2015/0002795 A1* | 1/2015 | Li ..................... G02F 1/134309 |
| | | 349/139 |
| 2016/0246115 A1 | 8/2016 | Fan |
| 2016/0291405 A1 | 10/2016 | Frisken et al. |
| 2018/0231771 A1* | 8/2018 | Schuck, III .......... G02B 6/0038 |
| 2019/0250439 A1* | 8/2019 | Urey ................. G02F 1/136209 |
| 2020/0249536 A1 | 8/2020 | Fan |

FOREIGN PATENT DOCUMENTS

| | | |
|---|---|---|
| CN | 108845442 A | 11/2018 |
| CN | 109164651 A | 1/2019 |
| JP | 2004-004397 A | 1/2004 |
| JP | 2008-176150 A | 7/2008 |
| JP | 2008-250220 A | 10/2008 |
| WO | 01/95619 A2 | 12/2001 |
| WO | 2004/104680 A1 | 12/2004 |

* cited by examiner

LCOS DISPLAY DEVICE AND ELECTRONIC DEVICE

CROSS-REFERENCE TO RELATED APPLICATION

This application claims the priority of Chinese patent application number 202110112514.6, filed on Jan. 27, 2021, the entire contents of which are incorporated herein by reference.

TECHNICAL FIELD

The present invention pertains to the field of liquid crystal display technology, in particular, relates to an LCOS display device and an electronic device.

BACKGROUND

Liquid Crystal on Silicon (LCOS) display devices are reflective liquid crystal display (LCD) devices that "project" color images based on liquid crystal control accomplished by semiconductor silicon crystal technology. LCOS display devices are mainly used in projectors, AR/VR imaging systems, light modulators and wavelength selective switches (WSSs).

An LCOS display device is comprised of many pixels that are arranged in a matrix and include pixel electrodes made essentially of aluminum, with silicon dioxide being filled in the gaps between adjacent pixel electrodes. A wavelength selective switch (WSS) is capable of modulation at a particular wavelength up to $\pi$ or $2\pi$, which results in controlled diffraction. Generally, such modulation processes allow output angle control, also known as "beam steering". In practical applications, between pixel electrode and pixel electrode gaps, diffracted light can be produced, this diffracted light may be considered as a noise to output light with a controlled angle. The increasing data transmission speed and density are requiring the elimination of such noises.

Minimizing inter-pixel electrode gaps and thus maximizing the area occupied by the electrodes is considered the best approach to reduce diffraction noise. However, limited by contemporary semiconductor processes, further reducing the inter-pixel electrode gaps is difficult.

Although forming an overall reflector stack structure over the surfaces of all pixel electrodes can reduce diffraction from the gaps between the pixel electrodes, this approach is still problematic. A dielectric mirror coating in the reflector stack tends to have internal or surface defects, and the reflector stack may add a significant load at higher wavelengths when a liquid crystal driving voltage is applied. This tends to make liquid crystal driving out of balance.

SUMMARY OF THE INVENTION

It is an object of the present invention to provide a liquid crystal on silicon (LCOS) display device and an electronic device, with reduced diffraction noise from gaps between pixel electrodes and hence minimized noise in output signals. Moreover, no additional load is placed, avoiding making liquid crystal driving out of balance.

To this end, the present invention provides an LCOS display device comprising a wafer substrate and a pixel electrode layer located over the wafer substrate. The pixel electrode layer comprises a plurality of pixel electrodes, wherein between adjacent pixel electrodes there is provided: a reflector stack; or at least one stack comprised of a first high refractive index insulating layer and a first low refractive index insulating layer stacked vertically downward.

Additionally, the reflector stack may comprise a first reflective metal layer, a dielectric layer and a second reflective metal layer, which are stacked.

Additionally, each or either of the first reflective metal layer and the second reflective metal layer may be made of a material comprising at least one of copper, aluminum, titanium, tantalum, gold, zinc and silver.

Additionally, a second high refractive index insulating layer is provided under a gap between adjacent pixel electrodes, wherein a projection of the second high refractive index insulating layer on the pixel electrode layer encompasses the gap between the adjacent pixel electrodes.

Additionally, each or either of the first high refractive index insulating layer and the second high refractive index insulating layer may be made of a material comprising at least one of Si3N4, Ti2O3, TiO2 and ZnSe.

Additionally, the first low refractive index insulating layer may include a silicon dioxide layer.

Additionally, the first high refractive index insulating layer may have a thickness equal to a quarter of an incident wavelength received at the LCOS display device divided by a refractive index of the first high refractive index insulating layer, and the first low refractive index insulating layer may have a thickness equal to a quarter of the incident wavelength received at the LCOS display device divided by a refractive index of the first low refractive index insulating layer.

Additionally, the LCOS display device may further comprise a first alignment layer, a liquid crystal layer, a second alignment layer, a transparent conductive layer, a glass substrate and an anti-reflection layer, which are stacked sequentially over the pixel electrode layer.

Additionally, an insulating layer may be disposed between the pixel electrode layer and the wafer substrate, wherein a driver circuitry is formed in the wafer substrate, and wherein each pixel electrode in the pixel electrode layer is electrically connected to the driver circuitry by a corresponding plug penetrating through the insulating layer.

The present invention also provides an electronic device comprising a liquid crystal on silicon (LCOS) display device, wherein the LCOS display device comprises a wafer substrate and a pixel electrode layer located over the wafer substrate, the pixel electrode layer comprising a plurality of pixel electrodes, wherein between adjacent pixel electrodes there is provided: a reflector stack; or at least one stack comprised of a first high refractive index insulating layer and a first low refractive index insulating layer stacked vertically downward.

Additionally, the reflector stack may comprise a first reflective metal layer, a dielectric layer and a second reflective metal layer, which are stacked.

Additionally, each or either of the first reflective metal layer and the second reflective metal layer may be made of a material comprising at least one of copper, aluminum, titanium, tantalum, gold, zinc and silver.

Additionally, a second high refractive index insulating layer is provided under a gap between adjacent pixel electrodes, wherein a projection of the second high refractive index insulating layer on the pixel electrode layer encompasses the gap between the adjacent pixel electrodes.

Additionally, each or either of the first high refractive index insulating layer and the second high refractive index insulating layer may be made of a material comprising at least one of Si3N4, Ti2O3, TiO2 and ZnSe.

Additionally, the first low refractive index insulating layer may include a silicon dioxide layer.

Additionally, the first high refractive index insulating layer may have a thickness equal to a quarter of an incident wavelength received at the LCOS display device divided by a refractive index of the first high refractive index insulating layer, and the first low refractive index insulating layer may have a thickness equal to a quarter of the incident wavelength received at the LCOS display device divided by a refractive index of the first low refractive index insulating layer.

Additionally, the LCOS display device may further comprise a first alignment layer, a liquid crystal layer, a second alignment layer, a transparent conductive layer, a glass substrate and an anti-reflection layer, which are stacked sequentially over the pixel electrode layer.

Additionally, an insulating layer may be disposed between the pixel electrode layer and the wafer substrate, wherein a driver circuitry is formed in the wafer substrate, and wherein each pixel electrode in the pixel electrode layer is electrically connected to the driver circuitry by a corresponding plug penetrating through the insulating layer.

Compared with the prior art, the present invention offers the benefits as follows:

It provides an LCOS display device and an electronic device, which includes a wafer substrate and a pixel electrode layer located over the wafer substrate. The pixel electrode layer comprises a plurality of pixel electrodes, wherein between adjacent pixel electrodes there is provided: a reflector stack or at least one stack comprised of a first high refractive index insulating layer and a first low refractive index insulating layer stacked vertically downward, is arranged between every adjacent pixel electrodes. By arranging the reflector stacks or stacked layers (in the gaps) between adjacent pixel electrodes, the gaps exhibit higher reflectivity and produce less diffraction noise. As a result, signals are output with reduced noise. Moreover, a liquid crystal driving voltage will not experience a drop across the reflector stacks or stacked layers, thereby solving the problem that an additional load introduced in the conventional design with a reflector stack formed over the surfaces of the pixel electrodes may cause a drop in the voltage applied to the liquid crystal layer. No additional load is placed, and out-of-balance liquid crystal driving can be avoided. Further, additional formation of optically functional films over the pixels is dispensed with, lowering the risk of defects.

In these figures,

11: a wafer substrate; 12: a driver circuitry; 13: a plug; 14: an insulating layer; 15: a reflector stack; 15c: a first reflective metal layer; 15b: a dielectric layer; 15a: a second reflective metal layer; 16: an isolation layer; 17: a pixel electrode; 18a: a first alignment layer; 18b: a second alignment layer; 19: a liquid crystal layer; 20: a transparent conductive layer; 21: a glass substrate; 22: an anti-reflection layer; 23a: a first high refractive index insulating layer; and 23b: a second high refractive index insulating layer.

DETAILED DESCRIPTION

On the basis of the above, there are provided a liquid crystal on silicon (LCOS) display device and an electronic device in embodiments of the present invention. The present invention will be described in greater detail below with reference to particular embodiments illustrated in the accompanying drawings. Advantages and features of the present invention will be more apparent from the following detailed description. Note that the figures are provided in a very simplified form not necessarily drawn to exact scale, and they are only intended to facilitate convenience and clarity in explaining the disclosed embodiments.

An LCOS display device according to an embodiment of the present invention includes a wafer substrate and a pixel electrode layer located over the wafer substrate, wherein the pixel electrode layer is provided with a plurality of pixel electrodes. A reflector stack or at least one stack composed of a first high refractive index insulating layer and a first low refractive index insulating layer, which are stacked vertically downward, is arranged between every adjacent two pixel electrodes. Here, the phrase "vertically downward" is meant to refer to a direction pointing from a side farther away from the wafer substrate to a side closer to the wafer substrate.

Figure 1:
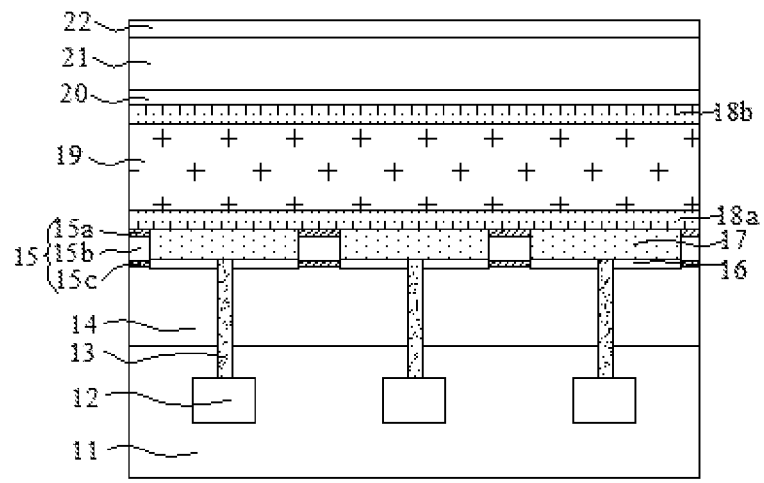
FIG. 1 is a schematic illustration of a liquid crystal on silicon (LCOS) display device according to embodiments of the present invention.

As shown in FIG. 1, the LCOS display device according to this embodiment includes the wafer substrate 11 and the pixel electrode layer located on the wafer substrate 11, wherein the pixel electrode layer is provided with a plurality of pixel electrodes. A reflector stack 15 is arranged between every adjacent two pixel electrodes 17. The wafer substrate 11 may be any suitable semiconductor material well known to those skilled in the art, such as silicon, germanium, silicon germanium, silicon carbide, silicon on insulator, germanium on insulator, gallium arsenide or the like. The wafer substrate 11 may contain driver circuitry 12 including metal interconnects and a plurality of MOS transistors, which are arranged into an array and configured to drive the respective pixel electrodes 17 in the pixel electrode layer. The driver circuitry 12 may be electrically connected to the pixel electrodes 17 by conductive vias 13, also known as plugs.

The reflector stack 15 fills the gaps between the adjacent pixel electrodes 17 so as to reduce diffraction from the gap. The reflector stack 15 may include a first reflective metal layer 15c, a dielectric layer 15b and a second reflective metal layer 15a, which are stacked together. The first reflective metal layer 15c may have a thickness that is equal to a quarter of an incident wavelength received at the LCOS display device divided by the refractive index of the first reflective metal layer 15c. The second reflective metal layer 15a may have a thickness that is equal to a quarter of the incident wavelength received at the LCOS display device divided by the refractive index of the second reflective metal layer 15a. The first reflective metal layer 15c or second reflective metal layer 15a may be conductive and have a smooth surface that reflects the incident light. Each of the first reflective metal layer 15c and the second reflective metal layer 15a may be made of a material comprising at least one of copper (Cu), aluminum (Al), titanium (Ti), tantalum (Ta), gold (Au), zinc (Zn) and silver (Ag), with Ag being more preferred. In this way, the reflective metal layers can have high reflectivity, high chemical stability and high material availability. The dielectric layer 15b may serve as an interference layer configured for reflectivity enhancement and may be structured as either a single layer or a stack comprised of multiple layers. The dielectric layer 15b may be transparent or translucent, and may be made of a material including at least one of silicon dioxide ($SiO_2$), silicon nitride ($Si_3N_4$), silicon oxynitride (SiON), aluminum oxide ($Al_2O_3$), titanium oxide ($TiO_2$), tantalum pentoxide ($Ta_2O_5$), hafnium (IV) oxide ($HaO_2$), titanium nitride (TiN), tantalum nitride (TaN), zinc oxide (ZnO) and magnesium fluoride ($MgF_2$). Preferably, the dielectric layer 15b is a stack of, for example, a titanium oxide layer, a silicon dioxide layer and a titanium oxide layer, which are stacked sequentially in this order. This can enhance the reflectance and reflectivity of the reflective metal layers as well as the adhesion with the reflective metal layers, resulting in an increase in the product's reliability. The titanium oxide layer may provide a buffering effect between the silicon dioxide layer and the reflective metal layer, which can avoid damage to the smooth surface of the reflective metal layer. As a transparent layer, the silicon dioxide layer allows enhanced reflectivity by optical interference.

The plurality of pixel electrodes 17 may be arranged into an array in the pixel electrode layer. The pixel electrode 17 may be arranged on an isolation layer 16, and the pixel electrode layer may be separated from the wafer substrate 11 by an insulating layer 14 made of, for example, silicon dioxide ($SiO_2$).

The LCOS display device may further include a first alignment layer 18a, a liquid crystal layer 19, a second alignment layer 18b, a transparent conductive layer 20, a glass substrate 21 and an anti-reflection layer 22, which are sequentially stacked over the pixel electrode layer.

The pixel electrodes 17 are configured to apply a voltage to one end of the liquid crystal layer 19, which can change a polarization conversion ratio of the liquid crystal layer 19 and thus enable control of a ratio of polarized components in reflected light exiting the liquid crystal layer 19. This, coupled with an optical engine design, can achieve gray-scale modulation of a displayed image. The pixel electrodes 17 may have highly reflective, and may be made of, for example, aluminum.

The first alignment layer 18a may be arranged on the pixel electrode layer, and the second alignment layer 18b may be disposed to face the first alignment layer 18a, with the liquid crystal layer 19 being interposed between the first alignment layer 18a and the second alignment layer 18b. The first alignment layer 18a and the second alignment layer 18b may be polymer layers, such as polyimide layers. The liquid crystal layer 19 may contain liquid crystal molecules, which are aligned by the first alignment layer 18a and the second alignment layer 18b and can be inclined under the action of an electric field created between the pixel electrodes 17 and the transparent conductive layer 20 (which is a common electrode lay) located on the second alignment layer 18b. In other words, a voltage applied by the pixel electrodes 17 and the transparent conductive layer 20 (i.e., a driving voltage of the LOS display device) can change the polarization conversion ratio of the liquid crystal layer 19, thus enabling control of a ratio of polarized components in reflected light exiting the liquid crystal layer 19. This, coupled with an optical engine design, can achieve gray-scale modulation of a displayed image. The first alignment layer 18a and the second alignment layer 18b may have individual rubbing directions. Each liquid crystal molecule in the liquid crystal layer 19 may be associated with a beta angle defined in relation to both the rubbing direction of the second alignment layer 18b and a horizontal direction of the wafer substrate 11 and a tilt angle defined in relation to the rubbing directions of both the first alignment layer 18a and the second alignment layer 18b.

In the LOS display device according to this embodiment, since the driving voltage is applied to the pixel electrodes 17 and the transparent conductive layer 20, it will not experience a drop across the reflector stacks 15, thus solving the problem of an additional load introduced in the conventional design with a reflector stack formed over the surfaces of the pixel electrodes, which may cause a drop in the voltage applied to the liquid crystal layer. It will be appreciated that, in the conventional design with a reflector stack formed over the surfaces of the pixel electrodes, since the reflector stack is situated between the electrodes (i.e., the pixel electrodes and the transparent conductive layer) to which the voltage is applied, there will be a drop in the voltage, which may add a significant load.

The transparent conductive layer 20 may contain a transparent, conductive material such as, for example, indium tin oxide, indium zinc oxide or another suitable material. The glass substrate 21 may be disposed on the transparent conductive layer 20 and configured to receive incident light and provide protection to the underlying layers. The glass substrate 21 is preferably made of quartz, fused silica, high temperature resistant glass or glass with a thermal expansion coefficient similar to that of a silicon substrate, which can impart enhanced mechanical properties to the display device. The anti-reflection layer 22 may be configured to protect the glass substrate 21 from mechanical damage and reduce reflection of incident light at a top surface of the glass substrate 21.

Figure 2:
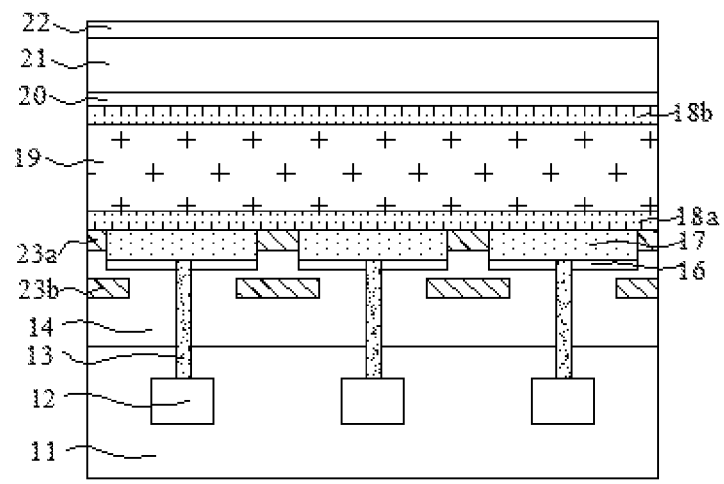
FIG. 2 is a schematic illustration of another LCOS display device according to embodiments of the present invention.

As shown in FIG. 2, another LCOS display device according to an embodiment of the present invention includes a wafer substrate 11 and a pixel electrode layer located over the wafer substrate 11. The pixel electrode layer contains a plurality of pixel electrodes 17, and at least a stack comprised of a first high refractive index insulating layer 23a and a first low refractive index insulating layer, which are stacked vertically downward, is arranged between every adjacent two pixel electrodes 17. The first high refractive index insulating layer 23a may be formed by vapor deposition or magnetron sputtering. Additionally, under the gap between every adjacent two pixel electrodes 17, there may be formed a second high refractive index insulating layer 23b having a projection on the pixel electrode layer, which encompasses the gap between the adjacent pixel electrodes 17. An insulating layer 14 may be formed between the pixel electrode layer and the wafer substrate 11, and between the first high refractive index insulating layers 23a and the wafer substrate 11. Portions of the insulating layer 14 between the first high refractive index insulating layers 23a and the second high refractive index insulating layers 23b may serve as the first low refractive index insulating layers, and portions of the insulating layer 14 between the second high refractive index insulating layers 23b and the wafer substrate 11 may serve as second low refractive index insulating layers. In this way, in this embodiment, between every adjacent two pixel electrodes 17, there are two stacks positioned vertically one above the other, each of which consists of a high refractive index insulating layer and a low refractive index insulating layer. The insulating layer 14 may be formed of, for example, silicon dioxide. The second high refractive index insulating layer 23b may also be formed by vapor deposition or magnetron sputtering. Each or either of the first high refractive index insulating layer 23a and the second high refractive index insulating layer 23b may be formed of a material comprising at least one of $Si_3N_4$, $Ti_2O_3$, TiO₂ and ZnSe. The first high refractive index insulating layer 23a may have a thickness that is equal to a quarter of an incident wavelength received at the LCOS display device divided by the refractive index of the first high refractive index insulating layer 23a. The first low refractive index insulating layer (i.e., a portion of the insulating layer 14 located between the corresponding first high refractive index insulating layer 23a and second high refractive index insulating layer 23b) may have a thickness that is equal to a quarter of the incident wavelength received at the LCOS display device divided by the refractive index of the first low refractive index insulating layer. Such a thickness design allows the inter-pixel gaps to have good reflectivity and produce reduced diffraction noise.

As an example, the first high refractive index insulating layer 23a may be a $Si_3N_4$ layer, and the first low refractive index insulating layer may be a $SiO_2$ layer. The incident wavelength may be 1,550 nm. The refractive index of $Si_3N_4$ is close to 2.04, so the thickness of the first high refractive index insulating layer 23a (e.g., $Si_3N_4$) may be 1,550/4/2.04=189 (nm). The thickness of the first high refractive index insulating layer 23a (e.g., Si3N4) may range from 185 nm to 195 nm. Since the refractive index of $SiO_2$ is close to 1.47, the thickness of the first low refractive index insulating layer (e.g., $SiO_2$) may be 1,550/4/1.47=263 (nm). The thickness of the first low refractive index insulating layer (e.g., $SiO_2$) may range from 260 nm to 270 nm. The LCOS display device may further include a first alignment layer 18a, a liquid crystal layer 19, a second alignment layer 18b, a transparent conductive layer 20, a glass substrate 21 and an anti-reflection layer 22, which are sequentially stacked over the pixel electrode layer. The insulating layer 14 may be disposed between the pixel electrode layer and the wafer substrate 11. In the wafer substrate 11, driver circuitry 12 may be formed, and the pixel electrodes 17 in the pixel electrode layer may be electrically connected to the driver circuitry 12 by plugs 13 penetrating through the insulating layer 14. This portion is the same in structure as that of the above-described LCOS display device, so a detailed description will be omitted.

In the LOS display device according to this embodiment, a liquid crystal driving voltage is applied to the pixel electrodes 17 and the transparent conductive layer 20 and will not experience a voltage drop either across the first high refractive index insulating layers 23a or across the second high refractive index insulating layers 23b. Therefore, the problem that an additional load introduced in the conventional design with a reflector stack formed over the surfaces of the pixel electrodes may cause a drop in the voltage applied to the liquid crystal layer can also be solved.

The LCOS display devices respectively shown in FIGS. 1 and 2 differ from each other essentially in that the materials filled between adjacent pixel electrodes 17 are different. In the LCOS display device of FIG. 2, at least a stack comprised of a first high refractive index insulating layer 23a and a first low refractive index insulating layer, which are stacked vertically downward, is filled between every adjacent two pixel electrodes 17, whilst in the LCOS display device of FIG. 1, a reflector stack is filled between every adjacent two pixel electrodes 17.

Figure 3:
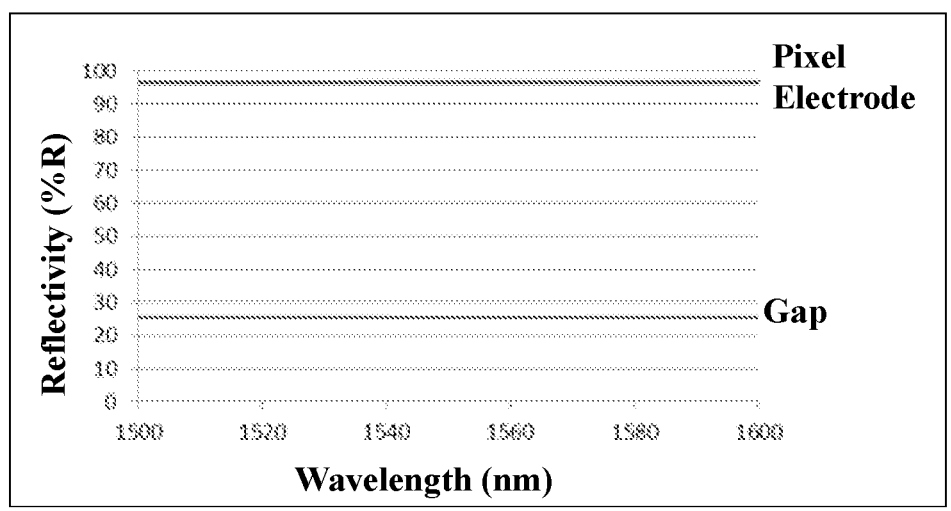
FIG. 3 schematically illustrates reflectivity testing of the LCOS display devices according to embodiments of the present invention.

In FIG. 3, the abscissa represents an incident wavelength received at the LCOS display device in the range of, for example, 1,500-1,600 nm, and the ordinate represents the actually measured reflectivity. As can be seen, both the LCOS display devices of FIG. 1 and FIG. 2 exhibit a reflectivity of 20-30% at the gaps between adjacent pixel electrodes 17, which can ensure sufficiently low diffraction from the pixel surfaces, and a reflectivity of 90-100% at the pixel electrodes 17, which allows good reflection performance of the pixel electrodes 17 and reduced diffraction noise from the gaps between pixel electrodes 17.

In some embodiments, each of the LCOS display devices may further include a color filter layer (not shown) between the pixel electrode layer and the first alignment layer 18a. The color filter layer may contain, for example, a coloring or dyeing material such as a high-molecular polymer, or any other suitable material. The color filter layer may include a plurality of color filter elements, each corresponding to a respective one of the pixel electrodes 17 and configured to allow the passage of light of a particular color. In this way, a desired color rendering performance can be achieved.

Both the above LCOS display devices can be used in wavelength selective switches (WSSs) that allow flexible configuration of channels and are able to meet the demand for multi-port, high-capacity optical communication. A signal from an optical fiber is beam-expanded by a collimator lens, and its components of different wavelengths are spatially separated at a diffraction grating and imaged to different regions of the LCOS display device by a Fourier prism, thus achieving switching or modulation. The diffracted signals can follow the same optical path back and be routed to corresponding output ports according to the signal modulation scheme. This optical path can be flexibly used in WSSs on the basis of angle and position calculation.

The present invention also provides an electronic device incorporating either of the above LCOS display devices as a display component (display means) for displaying video signals input to, or produced within, the electronic device as images or a video. The electronic device may be implemented as a micro projector, a monitor or a portable terminal device. The portable terminal device may be a digital camera, a video camera, a game console, a laptop PC, an e-book, a mobile phone, a wearable device (e.g., head-mounted, wrist-mounted, glasses-type, or the like), etc. Incorporating the LCOS display device of the present invention allows better display performance and higher reliability of the electronic device.

In summary, the present invention provides an LCOS display device and an electronic device, which includes a wafer substrate and a pixel electrode layer located over the wafer substrate. The pixel electrode layer contains a plurality of pixel electrodes, and a reflector stack or at least a stack of, stacked vertically downward, a first high refractive index insulating layer and a first low refractive index insulating layer is arranged between every adjacent two pixel electrodes. By arranging the reflector stacks or stacked layers (in the gaps) between adjacent pixel electrodes, the gaps exhibit higher reflectivity and produce less diffraction noise. As a result, signals are output with reduced noise. Moreover, a liquid crystal driving voltage will not experience a drop across the reflector stacks or stacked layers, thereby solving the problem that an additional load introduced in the conventional design with a reflector stack formed over the surfaces of the pixel electrodes may cause a drop in the voltage applied to the liquid crystal layer. Since no additional load is placed, out-of-balance liquid crystal driving can be avoided. Further, additional formation of optically functional films over the pixels is dispensed with, lowering the risk of defects.

The embodiments disclosed herein are described in a progressive manner, with the description of each embodiment focusing on its differences from others. Reference can be made between the embodiments for their identical or similar parts. Since the method embodiments correspond to the device embodiments, they are described relatively briefly, and reference can be made to the device embodiments for more details in the method embodiments.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A liquid crystal on silicon (LCOS) display device, comprising a wafer substrate and a pixel electrode layer located over the wafer substrate, the pixel electrode layer comprising a plurality of pixel electrodes, wherein a gap is provided between every adjacent pixel electrode and each gap is filled by:
   a reflector stack; or
   at least one stack comprised of a first high refractive index insulating layer and a first low refractive index insulating layer stacked vertically downward.

2. The LCOS display device of claim 1, wherein the reflector stack comprises a first reflective metal layer, a dielectric layer and a second reflective metal layer, which are stacked.

3. The LCOS display device of claim 2, wherein each or either of the first reflective metal layer and the second reflective metal layer is made of a material comprising at least one of copper, aluminum, titanium, tantalum, gold, zinc and silver.

4. The LCOS display device of claim 1, wherein a second high refractive index insulating layer is provided under the gap between adjacent pixel electrodes, wherein a projection of the second high refractive index insulating layer on the pixel electrode layer encompasses the gap between the adjacent pixel electrodes.

5. The LCOS display device of claim 4, wherein each or either of the first high refractive index insulating layer and the second high refractive index insulating layer is made of a material comprising at least one of $Si_3N_4$, $Ti_2O_3$, $TiO_2$ and ZnSe.

6. The LCOS display device of claim 4, wherein the first low refractive index insulating layer includes a silicon dioxide layer.

7. The LCOS display device of claim 4, wherein the first high refractive index insulating layer has a thickness equal to a quarter of an incident wavelength received at the LCOS display device divided by a refractive index of the first high refractive index insulating layer, and wherein the first low refractive index insulating layer has a thickness equal to a quarter of the incident wavelength received at the LCOS display device divided by a refractive index of the first low refractive index insulating layer.

8. The LCOS display device of claim 1, further comprising a first alignment layer, a liquid crystal layer, a second alignment layer, a transparent conductive layer, a glass substrate and an anti-reflection layer, which are stacked sequentially over the pixel electrode layer.

9. The LCOS display device of claim 1, wherein an insulating layer is disposed between the pixel electrode layer and the wafer substrate, wherein a driver circuitry is formed in the wafer substrate, and wherein each pixel electrode in the pixel electrode layer is electrically connected to the driver circuitry by a corresponding plug penetrating through the insulating layer.

10. An electronic device, comprising a liquid crystal on silicon (LCOS) display device, wherein the LCOS display device comprises a wafer substrate and a pixel electrode layer located over the wafer substrate, the pixel electrode layer comprising a plurality of pixel electrodes, wherein a gap is provided between every adjacent pixel electrode and each gap is filled by:
    a reflector stack; or
    at least one stack comprised of a first high refractive index insulating layer and a first low refractive index insulating layer stacked vertically downward.

11. The LCOS display device of claim 10, wherein the reflector stack comprises a first reflective metal layer, a dielectric layer and a second reflective metal layer, which are stacked.

12. The LCOS display device of claim 11, wherein each or either of the first reflective metal layer and the second reflective metal layer is made of a material comprising at least one of copper, aluminum, titanium, tantalum, gold, zinc and silver.

13. The LCOS display device of claim 10, wherein a second high refractive index insulating layer is provided under the gap between adjacent pixel electrodes, wherein a projection of the second high refractive index insulating layer on the pixel electrode layer encompasses the gap between the adjacent pixel electrodes.

14. The LCOS display device of claim 13, wherein each or either of the first high refractive index insulating layer and the second high refractive index insulating layer is made of a material comprising at least one of $Si_3N_4$, $Ti_2O_3$, $TiO_2$ and ZnSe.

15. The LCOS display device of claim 13, wherein the first low refractive index insulating layer includes a silicon dioxide layer.

16. The LCOS display device of claim 13, wherein the first high refractive index insulating layer has a thickness equal to a quarter of an incident wavelength received at the LCOS display device divided by a refractive index of the first high refractive index insulating layer, and wherein the first low refractive index insulating layer has a thickness equal to a quarter of the incident wavelength received at the LCOS display device divided by a refractive index of the first low refractive index insulating layer.

17. The LCOS display device of claim 10, further comprising a first alignment layer, a liquid crystal layer, a second alignment layer, a transparent conductive layer, a glass substrate and an anti-reflection layer, which are stacked sequentially over the pixel electrode layer.

18. The LCOS display device of claim 10, wherein an insulating layer is disposed between the pixel electrode layer and the wafer substrate, wherein a driver circuitry is formed in the wafer substrate, and wherein each pixel electrode in the pixel electrode layer is electrically connected to the driver circuitry by a corresponding plug penetrating through the insulating layer.

* * * * *